(12) United States Patent
Niccolini et al.

(10) Patent No.: US 10,305,354 B2
(45) Date of Patent: May 28, 2019

(54) APPARATUS FOR MANUFACTURING COMPONENTS OF DYNAMOELECTRIC MACHINES

(71) Applicant: ATOP S.P.A., Barberino val d'Elsa (IT)

(72) Inventors: Stefano Niccolini, Colle val d'Elsa (IT); Massimo Ponzio, Tavarnelle val di Pesa (IT)

(73) Assignee: ATOP S.P.A., Barberino val d'Elsa (IT)

( * ) Notice: Subject to any disclaimer, the term of this patent is extended or adjusted under 35 U.S.C. 154(b) by 0 days.

(21) Appl. No.: 15/636,421

(22) Filed: Jun. 28, 2017

(65) Prior Publication Data

US 2017/0302143 A1 Oct. 19, 2017

Related U.S. Application Data

(62) Division of application No. 15/028,693, filed as application No. PCT/EP2014/071226 on Oct. 3, 2014, now Pat. No. 9,722,475.

(30) Foreign Application Priority Data

Oct. 18, 2013 (IT) ................................ PI2013A0092

(51) Int. Cl.
*H02K 15/00* (2006.01)
*H02K 15/06* (2006.01)
(Continued)

(52) U.S. Cl.
CPC ........... *H02K 15/064* (2013.01); *H02K 3/345* (2013.01); *H02K 15/10* (2013.01)

(58) Field of Classification Search
CPC .............................. H02K 15/064; H02K 3/345
See application file for complete search history.

(56) References Cited

U.S. PATENT DOCUMENTS 2,476,744 A 7/1949 Leece
3,543,337 A * 12/1970 Meyn .................. B29C 33/0033
249/83
(Continued)

FOREIGN PATENT DOCUMENTS

DE 112011100868 T5 12/2012
EP 1 041 696 A1 10/2000
(Continued)

OTHER PUBLICATIONS

International Search Report and Written Opinion, dated May 4, 2015 for International Application No. PCT/EP2014/071226.
(Continued)

*Primary Examiner* — Minh Trinh
(74) *Attorney, Agent, or Firm* — Cooley LLP

(57) ABSTRACT

An apparatus for winding coils of dynamoelectric machines, wherein the apparatus includes means for inserting leg portions of a coil member in a plurality of slots of at least one core of a dynamoelectric machine, wherein each slot includes an insulation member lining the walls thereof. A passage member is provided with a plurality of passages and a plurality of support areas. Each passage is configured to receive a leg portion of a coil member, and each support area is arranged adjacent a respective passage. The apparatus further includes means to align the passage member with the at least one core to align the passages of the passage member with the slots of the core such that the plurality of passages each receive a respective leg portion of a coil member and corresponding support areas engage an end of a respective insulation member during insertion of the respective leg portions.

8 Claims, 6 Drawing Sheets

(51) Int. Cl.
*H02K 15/10* (2006.01)
*H02K 3/34* (2006.01)

(56) References Cited

U.S. PATENT DOCUMENTS

| | | | |
|---|---|---|---|
| 3,631,591 A | 1/1972 | Eminger | |
| 3,689,976 A * | 9/1972 | Donovan | H02K 15/068 29/732 |
| 4,052,783 A | 10/1977 | Shively | |
| 4,727,742 A | 3/1988 | Weaver | |
| 4,750,258 A * | 6/1988 | Anderson | H02K 15/068 29/596 |
| 4,901,433 A * | 2/1990 | Barrera | H02K 15/10 29/596 |
| 5,586,384 A | 12/1996 | Newman | |
| 5,619,787 A | 4/1997 | Couture et al. | |
| 6,140,735 A | 10/2000 | Kato et al. | |
| 6,208,060 B1 | 3/2001 | Kusase | |
| 6,376,961 B2 | 4/2002 | Murakami et al. | |
| 6,389,678 B1 * | 5/2002 | Ackermann | H02K 15/00 29/596 |
| 6,640,416 B1 * | 11/2003 | Sadiku | H02K 15/068 29/565 |
| 6,641,416 B2 | 11/2003 | Schulz et al. | |
| 6,782,600 B2 | 8/2004 | Yamazaki et al. | |
| 7,275,299 B2 * | 10/2007 | Kuroyanagi | H02K 15/0037 140/92.1 |
| 7,370,401 B2 | 5/2008 | Stratico et al. | |
| 7,480,987 B1 | 1/2009 | Guercioni | |
| 7,730,401 B2 | 6/2010 | Gillespie et al. | |
| 7,941,910 B2 | 5/2011 | Guercioni | |
| 8,215,000 B2 | 7/2012 | Guercioni | |
| 8,296,926 B2 | 10/2012 | Wang | |
| 8,424,792 B2 * | 4/2013 | Ponzio | H02K 15/095 242/432.3 |
| 8,555,694 B2 | 10/2013 | Saito et al. | |
| 8,607,436 B2 | 12/2013 | Ponzio et al. | |
| 8,826,513 B2 | 9/2014 | Guercioni | |
| 8,918,986 B2 * | 12/2014 | Guercioni | H02K 3/345 29/596 |
| 8,922,078 B2 | 12/2014 | Guercioni | |
| 9,300,193 B2 | 3/2016 | Guercioni | |
| 9,455,614 B2 | 9/2016 | Corbinelli et al. | |
| 9,467,029 B2 | 10/2016 | Ponzio et al. | |
| 9,479,033 B2 | 10/2016 | Ponzio et al. | |
| 9,520,762 B2 | 12/2016 | Guercioni | |
| 9,692,283 B2 | 6/2017 | Ponzio et al. | |
| 9,722,475 B2 * | 8/2017 | Niccolini | H02K 15/064 |
| 9,755,487 B2 * | 9/2017 | Ponzio | H02K 15/0075 |
| 2001/0007169 A1 | 7/2001 | Takahashi | |
| 2002/0017585 A1 | 2/2002 | Haruta et al. | |
| 2002/0053126 A1 | 5/2002 | Maeda et al. | |
| 2002/0089250 A1 | 7/2002 | Naka et al. | |
| 2003/0137207 A1 | 7/2003 | Tamura et al. | |
| 2003/0159270 A1 | 8/2003 | Kato | |
| 2003/0233748 A1 | 12/2003 | Gorohata et al. | |
| 2004/0040142 A1 | 3/2004 | Hirota et al. | |
| 2005/0236509 A1 | 10/2005 | Burch et al. | |
| 2006/0001327 A1 | 1/2006 | Ossenkopp et al. | |
| 2006/0022547 A1 | 2/2006 | Sadiku et al. | |
| 2008/0148794 A1 | 6/2008 | Patterson et al. | |
| 2009/0233748 A1 | 9/2009 | Boddy | |
| 2009/0249853 A1 | 10/2009 | Young et al. | |
| 2010/0325875 A1 | 12/2010 | Ponzio et al. | |
| 2013/0162072 A1 | 6/2013 | Mizutani | |
| 2014/0196282 A1 | 7/2014 | Stephenson et al. | |
| 2014/0300239 A1 | 10/2014 | Takizawa et al. | |
| 2016/0254733 A1 | 9/2016 | Niccolini | |
| 2016/0365777 A1 | 12/2016 | Corginelli et al. | |
| 2017/0012511 A1 | 1/2017 | Ponzio et al. | |
| 2018/0233999 A1 | 8/2018 | Ponzio et al. | |
| 2018/0294700 A1 | 10/2018 | Ponzio et al. | |

FOREIGN PATENT DOCUMENTS

| | | |
|---|---|---|
| EP | 1 041 702 A2 | 10/2000 |
| EP | 1 043 828 A2 | 10/2000 |
| EP | 1 061 635 A2 | 12/2000 |
| EP | 1 304 789 A1 | 4/2003 |
| EP | 1 324 463 A2 | 7/2003 |
| EP | 1 328 059 A2 | 7/2003 |
| EP | 1 372 242 A2 | 12/2003 |
| EP | 1 376 816 A2 | 1/2004 |
| EP | 1 710 896 A1 | 10/2006 |
| EP | 1 727 260 A2 | 11/2006 |
| EP | 1 043 828 B1 | 9/2009 |
| FR | 2 845 536 A1 | 4/2004 |
| FR | 2 896 351 A1 | 7/2007 |
| FR | 2 968 858 A1 | 6/2012 |
| GB | 6 447 61 | 10/1950 |
| GB | 644761 | 10/1950 |
| WO | WO 2008/108317 A1 | 9/2008 |
| WO | WO 2011/004100 A2 | 1/2011 |
| WO | WO 2012/119691 A1 | 9/2012 |
| WO | WO 2012/156066 A2 | 11/2012 |
| WO | WO 2013/190860 A1 | 12/2013 |

OTHER PUBLICATIONS

Search Report and Written Opinion, dated Jul. 28, 2014, for IT Industrial Invention No. PI20130092.
International Preliminary Report on Patentability dated Sep. 10, 2013 for International Application No. PCT/EP2012/000633.
International Preliminary Report on Patentability, dated Nov. 19, 2013, for International Application No. PCT/EP2012/002055.
International Search Report and Written Opinion dated Jan. 23, 2013 for International Application No. PCT/EP2012/0002055.
International Search Report and Written Opinion, dated Apr. 5, 2012, for International Application No. PCT/EP2012/000633.
International Search Report and Written Opinion, dated Jun. 19, 2015, for International Application No. PCT/EP2015/054254.
International Search Report and Written Opinion, dated Jul. 20, 2016 for International Application No. PCT/IB2016/052200.
Search Report and Written Opinion completed Nov. 8, 2011 for IT TO2011A000199.
Search Report and Written Opinion completed Feb. 2, 2012 for IT TO2011A000435.
Search Report for Italian Patent Application No. PI2015000031, completed Jan. 14, 2016.
Search Report for Italian Patent Application No. PI2015000032, completed Jan. 15, 2016.
Search Report for Italian Patent Application No. PI2015000033, completed Jan. 18, 2016.
Search Report for Italian Patent Application No. PI2015000034, completed Feb. 1, 2016.
Search Report for Italian Application No. IT 201700036222, completed Dec. 20, 2017, with English claims translation.

* cited by examiner

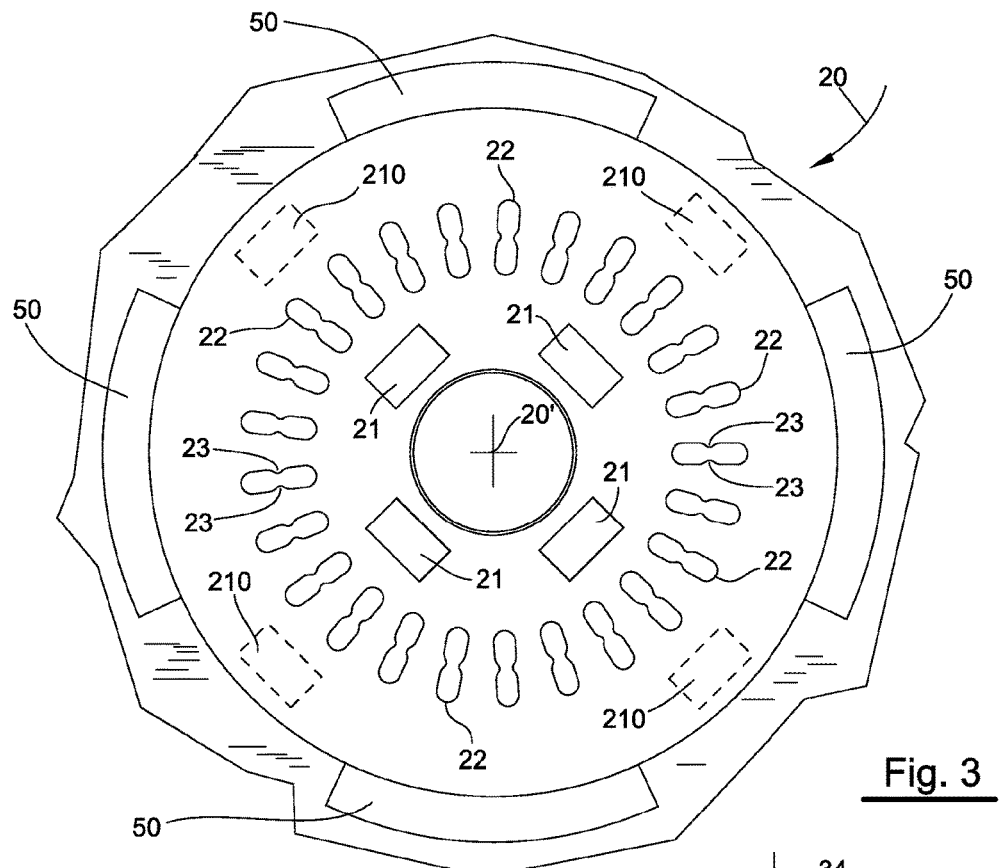
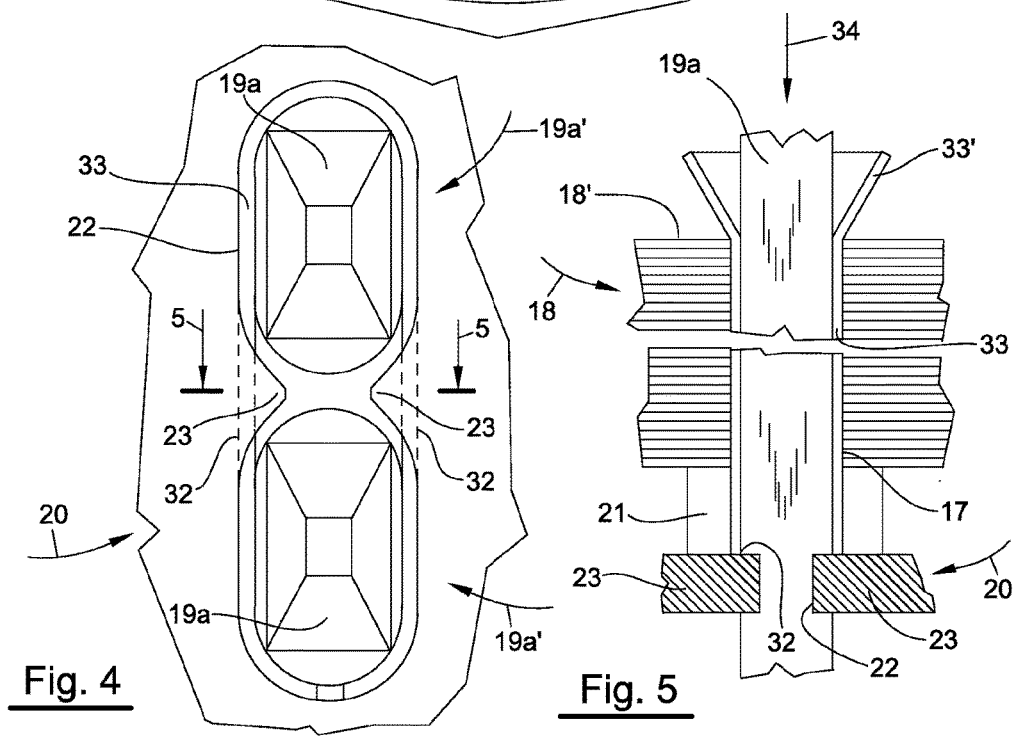
Fig. 3
Fig. 4
Fig. 5

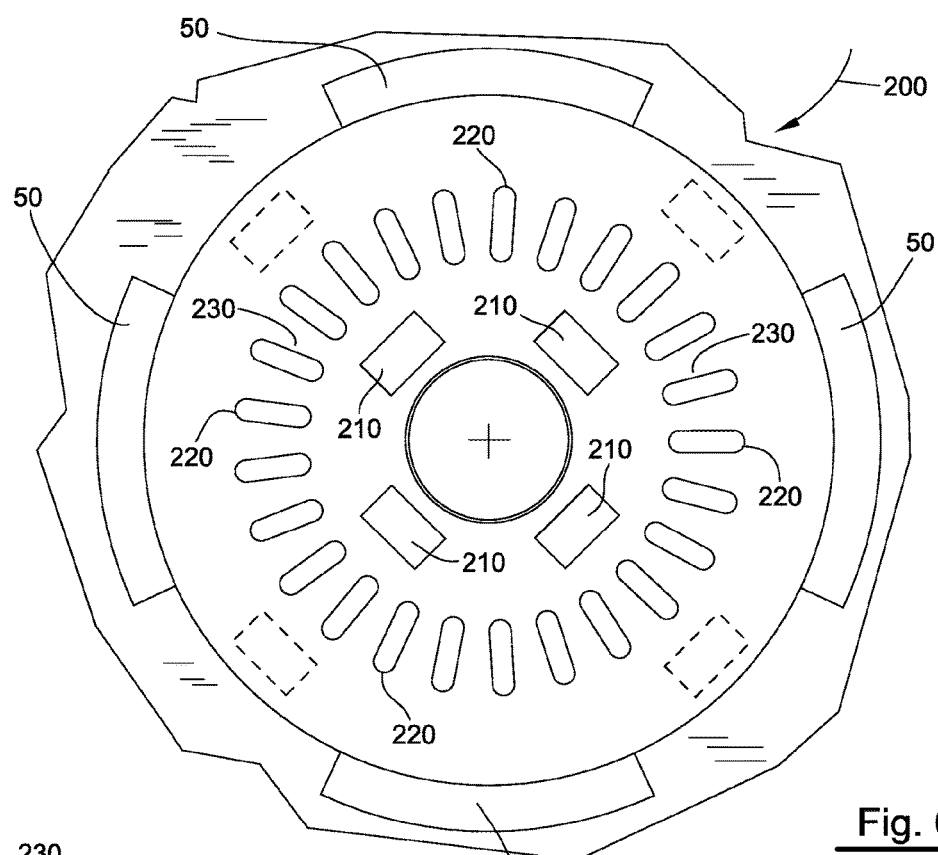
Fig. 6
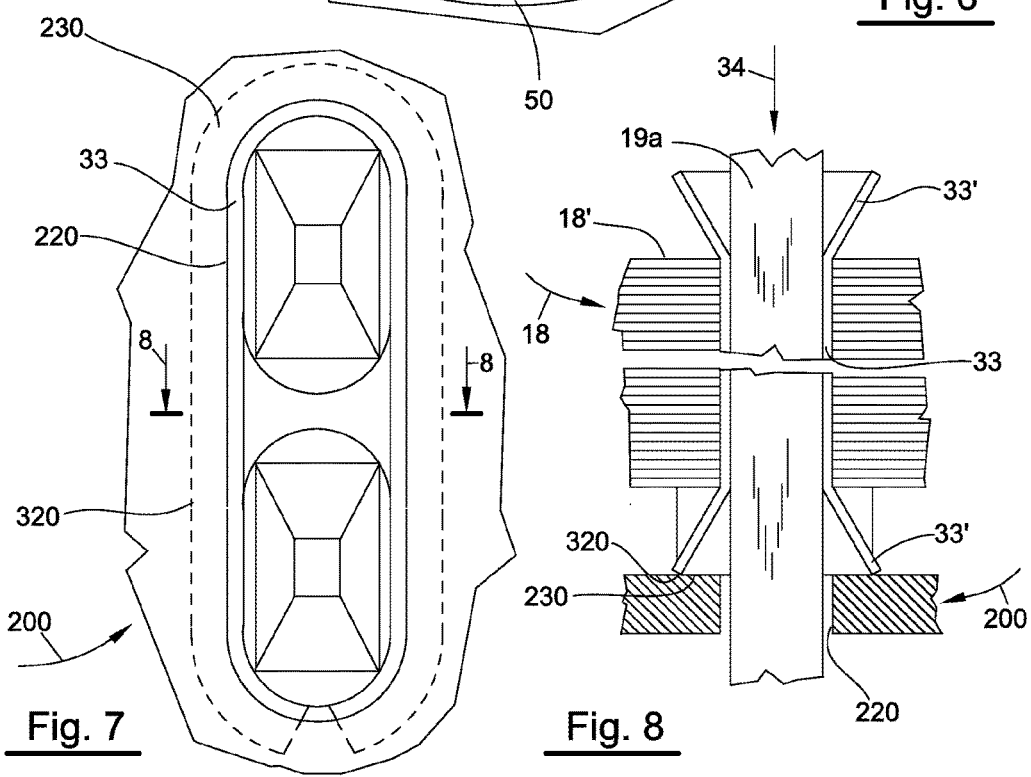
Fig. 7
Fig. 8

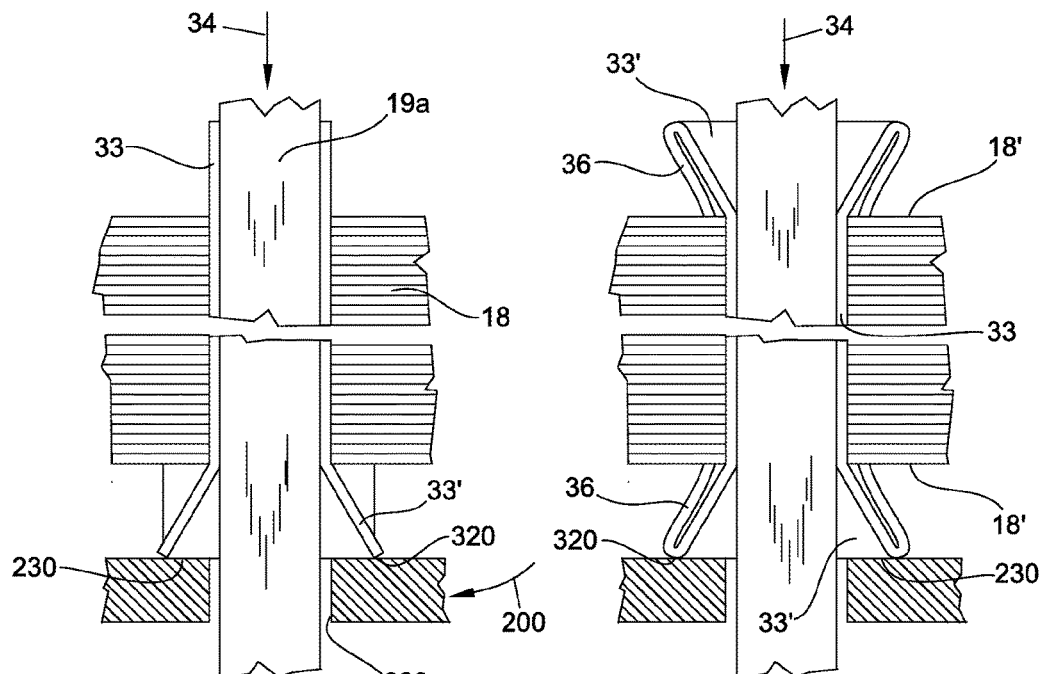
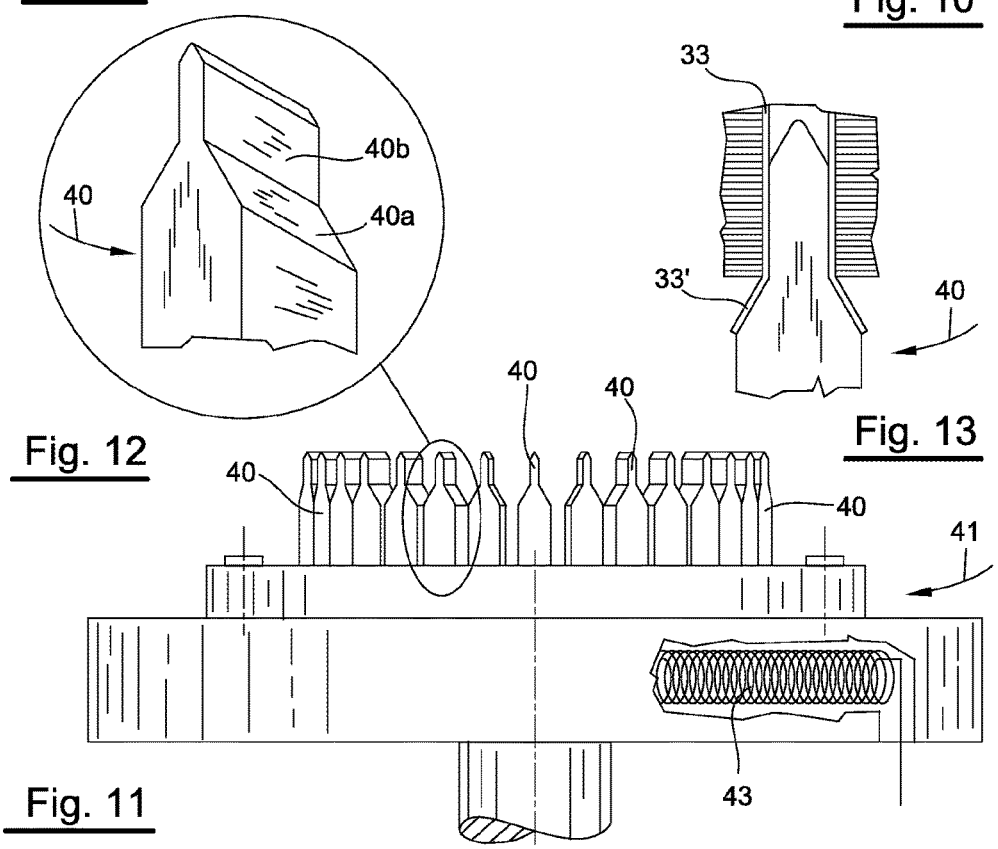

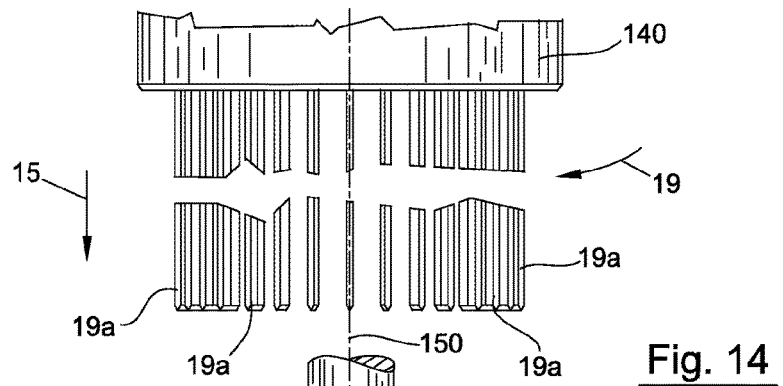
Fig. 14
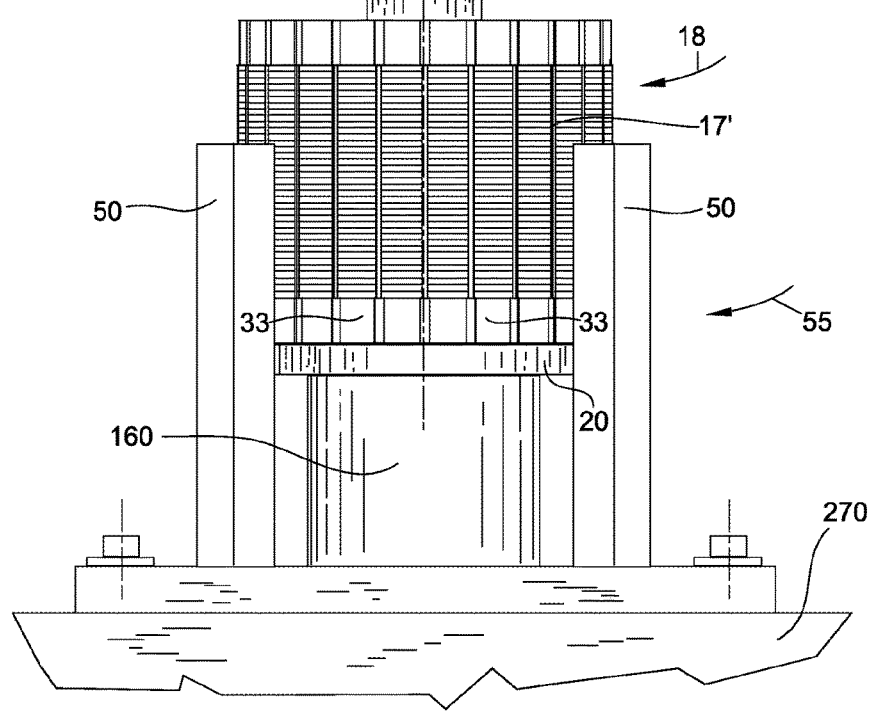
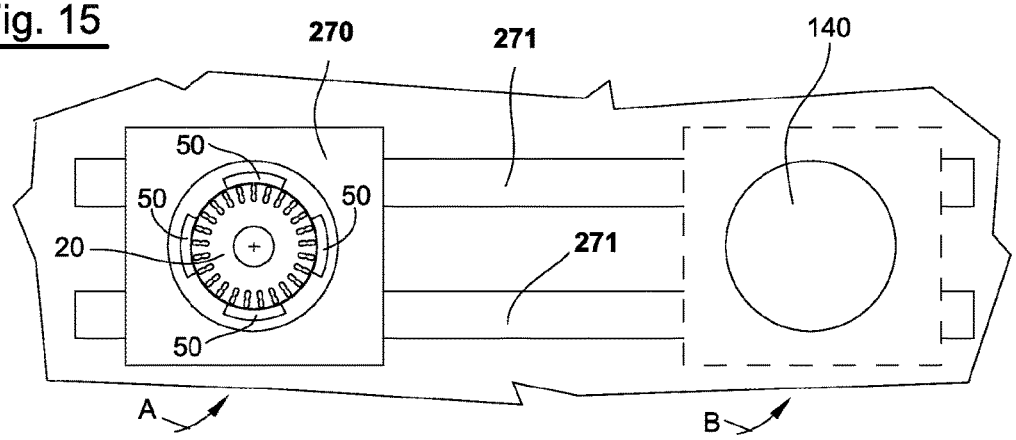
Fig. 15

APPARATUS FOR MANUFACTURING COMPONENTS OF DYNAMOELECTRIC MACHINES

CROSS REFERENCE TO RELATED APPLICATIONS

This application claims priority to U.S. application Ser. No. 15/028,693, filed Apr. 11, 2016, and entitled "Method for Manufacturing Components of Dynamoelectric Machines," (now U.S. Pat. No. 9,722,475, issued Sep. 1, 2016), which in turn claims priority to International Patent Application No. PCT/EP2014/071226, filed Oct. 3, 2014, and entitled "Apparatus and Method for Manufacturing Components of Dynamoelectric Machines," which claims priority to Italian Patent Application No. PI2013A000092, filed Oct. 18, 2013, and entitled "Apparatus and Method for Manufacturing Components of Dynamoelectric Machines." The present application incorporates herein by reference the disclosures of each of the above-referenced applications in their entireties.

BACKGROUND OF THE INVENTION

The present invention relates to solutions for winding rotor cores or stator cores using coil members consisting of U shaped members, or other configurations, formed from a conductor strip. The conductor strip normally presents a copper core coated with insulation material.

In particular, the invention relates to a method and an apparatus for winding coils of dynamoelectric machines of the type mentioned above.

DESCRIPTION OF THE PRIOR ART

A U shaped member has leg portions, which are inserted in respective slots of a core and a head portion, which joins the two leg portions. More particularly, the head portion remains outside of the slots and functions as an electrical connection portion between the leg portions. The leg portions form the magnetic field in the final dynamoelectric machine. These U shaped members are often referred to as hairpins, according to the terminology of the field.

An initial operation provides that a plurality of hairpins can be assembled together to form an entire coil assembly to be inserted in slots of the core. Successively, the core assembly is inserted in a core by aligning and inserting the leg portions in the slots. Alternatively, the U shaped members can be inserted singularly in the slots one after another to completely wind the cores. Apparatus and methods for performing the foregoing manufacturing stages have been described in GB644761.

Prior to inserting the leg portions in the cores, the slots are normally lined with insulation members to avoid direct contact of the conductor with the core material. The insulation members can be formed and inserted in the slots using solutions like those described in EP 1,061,635

Each insulation member is normally placed with portions that extend beyond the ends of the core by a predetermined distance. This distance guarantees required electrical insulation values of the completed core with respect to the coil conductors.

During insertion of the leg portions in the cores, the insulation members may be damaged or moved in the slot due to a pushing action that the conductor exerts on the surfaces of the insulation members. More particularly, when the leg portions are required to tightly fit in the available space of the slots to achieve a high slot fill, the insulation members is considerably pushed and may, as a result, be caused to move along the slots in the insertion direction. This unwanted movement causes a wrong positioning of the insulation member, and thereby causes serious malfunction problems.

SUMMARY OF THE INVENTION

It is therefore an object of the present invention to accomplish insertion of the leg portions of a coil in the slots of dynamoelectric machine without encountering the foregoing inconveniences of the prior art.

It is also an object of the invention to provide solutions for producing cores of dynamoelectric machine having high slot fill when leg portions of a coil need to inserted in the slots.

These and other objects are achieved by the apparatus of independent apparatus claim 1.

According to another aspect of the invention a method for winding coils of a dynamoelectric machine is described in independent method claim 9.

Other characteristics of the invention are described in the dependent claims.

BRIEF DESCRIPTION OF THE DRAWINGS

The invention will be now illustrated with the following description of an exemplary embodiment thereof, exemplifying but not limitative, with reference to the attached drawings in which:

FIG. 3 is a plan view of the apparatus of the invention from a direction 3 of FIGS. 1 and 2 without showing the stator core or the rotor core for reasons of clarity;

FIG. 4 is a partial view similar to the view of FIG. 3, although as seen from an observer viewing from the opposite side of the sheet containing FIG. 3. FIG. 4 illustrates a core where the leg portions have been inserted in the slots according to the principles of the invention;

FIG. 5 is a partial section view as seen from directions 5-5 of FIG. 4;

FIG. 6 is a view similar to the view of FIG. 3 illustrating a second embodiment of the invention;

FIG. 7 is a partial view similar to the view of FIG. 6, although as seen from an observer viewing from the opposite side of the sheet containing FIG. 6. FIG. 7 illustrates a core where the leg portions have been inserted in the slots according to the principles of the invention.

FIG. 8 is a partial section view from directions 8-8 of FIG. 7;

FIG. 9 is a view similar to the view of FIG. 8, although illustrating an alternative solution of the invention for processing a core;

FIG. 10 is a view similar to the view of FIG. 8, although illustrating a second alternative solution of the invention for processing a core;

FIG. 11 is an elevation view of an apparatus of the invention;

FIG. 12 is an enlarged view of a portion of FIG. 11;

FIG. 13 is a view of a portion of the apparatus of FIG. 11 in an operating stage of the invention;

FIG. 14 is an elevation view as seen from direction 14 of FIG. 1;

FIG. 15 is a plan view, similar to the view of FIG. 3, as seen from direction 15 of FIG. 14, where certain parts have been omitted for reasons of clarity.

DETAILED DESCRIPTION

Figure 1:
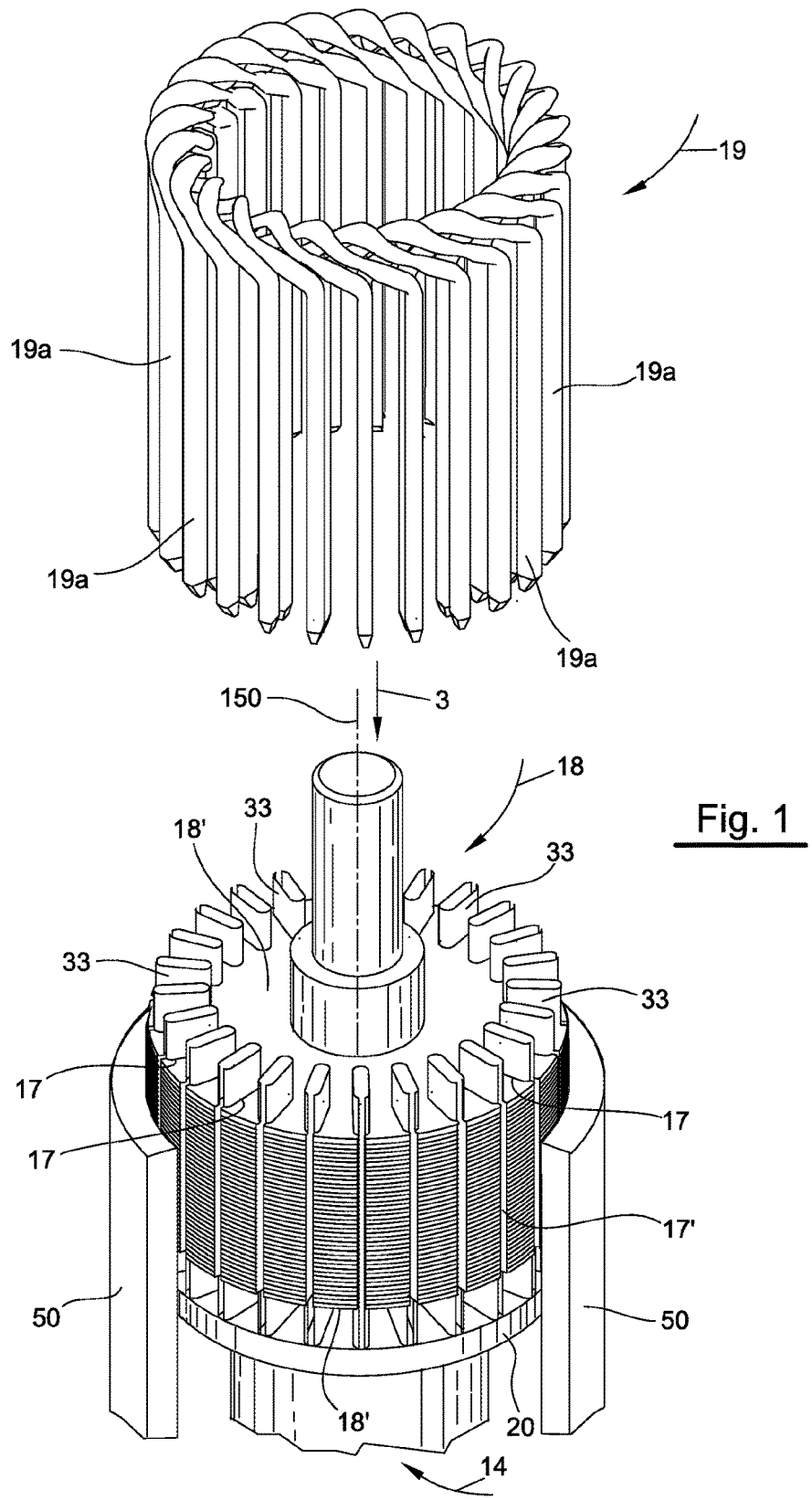
FIG. 1 is a prospective view illustrating a coil assembly aligned with a rotor core in an operating stage of the invention.

FIG. 1 illustrates a coil assembly 19 aligned with slots 17 of a rotor core 18. Insulation members 33 line the slots 17 and protrude from the ends 18' of rotor core 18, as shown in FIG. 1. Passage member 22, which will be described more in detail in the following, is centred around the central axis 150 of rotor core 18 and on one side of one of rotor core end 18', as shown in FIG. 1. The coil assembly 19 is held by a holding unit to result centred on the central axis 150 of rotor core 18. The holding unit has been omitted in FIG. 1 for reasons of clarity, although it is shown in FIGS. 14 and 15 where it is referenced with the number 140. The holding unit 140 holds coil assembly 19 so that leg portions 19a are aligned with respective slots 17. The holding unit 140 is moved towards rotor core 18 to insert the leg portions 19a in the respective slots 17. Column members 50, which engage the external surface of the rotor core 18 to centre the rotor core on the central axis 150 (see FIG. 15).

Figure 2:
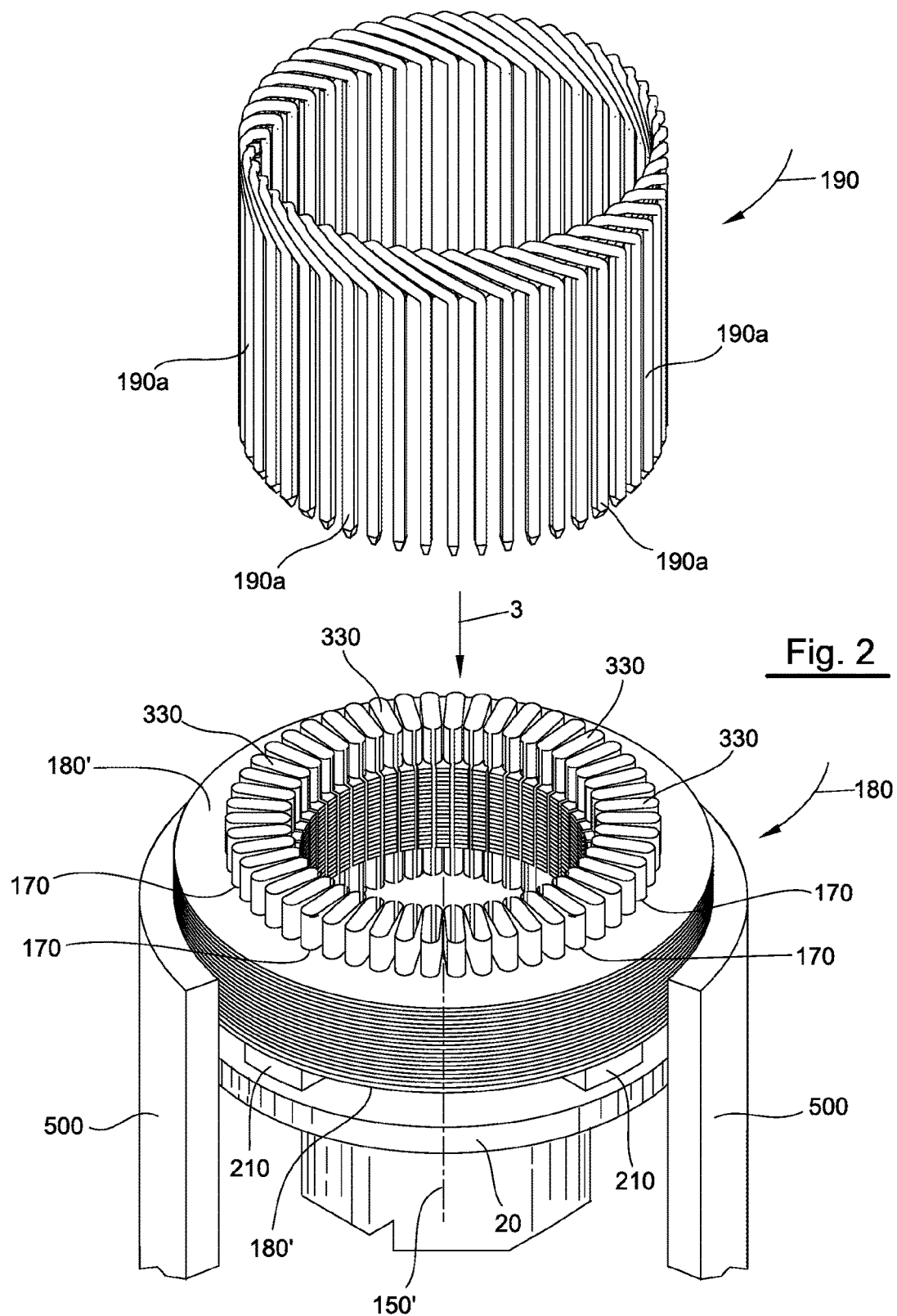
FIG. 2 is a prospective view illustrating a coil assembly aligned with a stator core in an operating stage of the invention.

FIG. 2 illustrates a solution similar to that of FIG. 1, but for inserting a coil assembly 190 in the slots of a stator core 180. More particularly, coil assembly 190 is aligned with slots 170 of stator core 180.

Insulation members 33 line the slots 170 and protrude from the ends of the stator core, as shown in FIG. 2. Passage member 22 is also provided centred with respect to central axis 150' of stator core 180 and on one side of a stator core end 180', as shown in FIGS. 2 and 3. The coil assembly 190 is held by a holding unit similar to that of FIGS. 14 and 15, and is centred on the central axis 150' of stator core 180. The holding unit holds coil assembly 190 so that leg portions 190a are aligned with respective slots 170. The holding unit is moved towards stator core 180 to insert the leg portions 190a in the respective slots 170. Column members 500, which engage the external surface of the stator core 180, centre the stator core with respect to the central axis 150'.

With reference to FIG. 3, passage member 20 is provided with a plurality of passages 22. According to the embodiment of FIG. 3, passages 22 are configured to have a narrower central portion, which forms two support areas 23 that are portions of the area adjacent to the edge of passages 22. More particularly, support areas 23 can be the ends of protuberances which extend inside passages 22, like is shown in FIGS. 3, 4 and 5.

FIGS. 3, 4 and 5 illustrate the application of passage member 20 for the insertion of insulation members 33 in the core 18 of a rotor. It should be appreciated that the principles described with reference to FIGS. 3, 4 and 5 can be equally applied for the insertion of insulation members 330 in the core 180 of a stator.

Passages 22 are positioned around central axis 20' of passage member 20 at equal angular distances from each other, like is shown in FIG. 3. The radial distance of the passages 22 from central axis 20' and the angular position of the passages 22 around central axis 20' is such that that passages 22 will be aligned with respective slots 17 or 170, respectively of the rotor core 18 or the stator core 180 that needs to be processed.

FIGS. 4 and 5 illustrate a situation where the rotor core 18 rests on support members 21, and with slots 17 of the rotor core 18 aligned with passages 22. In the case of processing a stator core, the latter can rest on support members 210, and slots 170 of the stator core 180 will be aligned with passages 22.

FIGS. 4 and 5 also show that leg portions 19a are inserted in a slot 17 lined with insulation member 33. The leg portions 19a are moved in insertion direction 34 to be inserted in the slots 33. Insertion direction 34 can be parallel to central axis 20' of passage member 20, once passage member 20 has been aligned with slots 17 by centering of the rotor core on behalf of column members 50 and the use of an index tooth that will be more fully described in the following.

As shown in FIGS. 4 and 5, an end 32 of insulation member 33 engages with the support areas 23 of passage member 20 during insertion of leg portions 19a in slots 17.

The engagement of the end 32 of insulation member 33 against support areas 23 avoids that insulation member 33 moves in the insertion direction 34 during the insertion of leg portions 19a. In FIG. 4, the portions of the end 32 of the insulation member 33, which engage support areas 23, are shown with dashed line representation. FIG. 4 also shows the sharpened ends 19a' of leg portions 19a, which favour the insertion of leg portions 19a in slots 17.

In the situation of FIGS. 4 and 5, the insulation member 33 of slots 17 has been flared, i.e. enlarged so in such a way to form a cone, in order to form an enlarged portion 33' on the side where the leg portions 19a start to enter the slots 17 during the insertion movement. The enlarged portion 33' avoids forcing of the leg portions 19a when entering the slots 17, and also acts as a stop member to prevent movement of the insulation members 33 along slots 17 during the insertion of coil assembly 19.

FIGS. 6, 7 and 8 relate to an embodiment of the invention where an enlarged portion 33' of the insulation member 33 has also been provided on the side of the rotor core 18, or of stator core 180, which is opposite to the side where the leg portions 19a enter the slots during insertion, as shown in FIG. 8 for a rotor core. Furthermore, with particular reference to FIG. 6, an alternative passage member 200 is foreseen having passages 220 which have a more extensive support area for the end 320 of an enlarged portion 33' of an insulation member 33. In this case the support area 230 for the end 320 of the enlarged portion 33' may consist in the entire contour surrounding a passage 220, like is shown in FIGS. 6, 7 and 8, to avoid movement of the insulation member 33 during the insertion of a coil assembly.

The situation of the end 320 of the insulation member being engaged along a continuous portion 230 surrounding a passage 220 of passage member 200 is shown with the dashed line representation in FIG. 7.

Although the figures show the areas as continuous surfaces, it is contemplated the possibility that the portions have a certain height and are distributed around the edges of the passages.

FIGS. 6-15 illustrate further principles of the invention applied for insertion of a coil assembly in the core 18 of a rotor. It should be noted that the principles described with reference to FIGS. 6-15 can be equally applied to the insertion of insulation members 330 in the core 180 of a stator.

FIG. 9 illustrates a situation without the enlarged portion 33' on the end of the rotor core 18 where the leg portions 19a enters during the insertion movement. This can be possible when the entrance stage of the leg portions 19a in slot 17 is not critical.

FIG. 10 illustrates a situation where the enlarged portions 33' of the insulation member 33 have a fold to form supplementary insulation portions 36, which are directed towards the rotor core ends 18'. In this case the ends 320 of the insulation member have double thickness, thereby resulting more stronger.

FIG. 11 illustrates an apparatus for producing the enlarged portions 33'. This apparatus comprises enlargement tools 40 assembled on a carrying member 41. The enlargement tools 40 can be present in a number that is equal to the number of slots 17 of the rotor core where the insulation members 33 require the enlarged portions 33'. The enlargement tools 40 are provided with a cone portion 40a and a narrow portion 40b, see also FIGS. 12 and 13. Carrying member 41 can be heated by means of electrical resistance 43. The heat developed by electrical resistance 43 is conducted through carrying member 41 and reaches each of enlargement tools 40. To produce the enlarged portions 33', each of the heated enlargement tools 40 can be aligned and inserted in a respective insulation member 33, as shown in FIG. 13 for one of the insulation members 33. This can be achieved by centering and moving carrying member 41 with respect to the rotor core 18, or with respect to the stator core 180 that is being processed. The heat present in enlargement tools 40 favours the bending of insulation member 33 to form the enlarged end 33' as shown in FIG. 13.

FIG. 14 illustrates a coil assembly 19 aligned with core slots 17 of a rotor core 18. The coil assembly is being held by holding unit 140. Holding units capable of holding the coil assemblies 19 and 190 during insertions operations have been described in GB644761.

With reference to FIG. 14, the rotor core 18 is supported along central axis 150 by support members 21 or 210 of passage members 20 or 200 (see FIGS. 3 and 6).

In FIG. 14, support members 21 or 210 of passage members 20 are hidden by insulation members 33 on the side 55 where the insulation members 33 reach engagement with passage member 20. Column members 50 which engage the external surface of the rotor core 18 centre the rotor core on the central axis 150, as shown in FIG. 14. A column member 50, which is towards the viewer of FIG. 14, has been removed for reasons of clarity, see also FIGS. 3 and 6, where all the column members 50 are represented.

A column member 50 may be provided with an index tooth (not shown), which engages the sides of an opening 17' of a rotor core slot 17. The index tooth maintains the rotor angularly oriented around central axis 150 after placement of the rotor core 18 on support members 21. A base member 160 is present in FIG. 14 to support passage member 20 along the central axis 150. Referring to FIG. 14 the base member and the columns are supported by a carrier platform 270.

As shown in FIG. 15, carrier platform 270 can move on rails 271 between position A and position B. In FIG. 15, rotor core 18 has been omitted, consequently passage member 20 and columns members 50 are visible. Position A can be the position of a station where a load/unload device places a rotor core to be processed on support members 21 (shown for example in FIG. 3) in the correct angular positions around central axis 150 so that the index tooth of a column member 50 can be engaged. This will result in the slots 17 of the rotor core being in alignment with the passages 22 of passage member 20, or with the passages 220 if using passage member 200. In position A, the same load/unload device can also remove the rotor core 18 from plate member 20 or plate member 200 once the core assembly 19 has been inserted.

To accomplish that the rotor core receives coil assembly 19, carrier platform 270 can be moved on rails 271 to reach position B where the insertion operation can be performed using holding unit 140, like is shown in FIGS. 7-10 and 14.

Enlargement of the ends of the insulation members 33 to produce enlarged portions 33', by using the principles described with reference to FIG. 11-13, can occur in a manufacturing position which is upstream with respect to position A.

Although the figures show coils comprising U-shaped member, the principles according to the present invention can be adopted even for winding coils of dynamo electric machine formed with members having different configurations and comprising a leg portion.

The foregoing description of specific exemplary embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:

1. An apparatus for winding coils of a dynamoelectric machine, the apparatus comprising:
   means for inserting leg portions of a coil member in a plurality of slots of at least one core of the dynamoelectric machine, wherein each slot includes an insulation member lining walls thereof;
   a passage member provided with a plurality of passages and a plurality of support areas, wherein:
      each passage of the plurality of passages is configured to receive a leg portion of the coil member, and
      each support area of the plurality of support areas is arranged adjacent a passage from the plurality of passages; and
   means for aligning the passage member with the at least one core to align the plurality of passages of the passage member with the slots of the at least one core such that the plurality of passages each receive a respective leg portion of the coil member and the support areas engage an end of a respective insulation member during insertion of the respective leg portions.

2. The apparatus of claim 1, wherein each support area of the plurality of support areas is provided with a restriction to narrow a respective passage in a central position of the respective passage.

3. The apparatus of claim 1, wherein each support area of the plurality of support areas surrounds an entire edge of a respective passage of the plurality of passages.

4. The apparatus of claim 1, wherein the support areas engage with an enlarged portion of the respective insulation member, the enlarged portion being provided on the end thereof where a leg portion enters a respective slot during insertion.

5. The apparatus of claim 1, wherein the support areas engage with an enlarged portion of the respective insulation member, and wherein the respective insulation member has enlarged portions on both sides of the slot.

6. The apparatus of claim 1, wherein the support areas engage with folded insulation portions configured at ends of the insulation members where a leg portion enters a respective slot during insertion.

7. The apparatus of claim 1, wherein:
the means for aligning the passage member includes a mobile platform, and
the mobile platform receives the passage member and transfers the passage member from a first position where the passage member becomes aligned with the at least one core to a second position where the leg portions become inserted in the plurality of slots of the at least one core.

8. The apparatus of claim 1, wherein the support areas engage with enlarged folded insulation portions configured at ends of the insulation members.

* * * * *